United States Patent [19]
Kim et al.

[11] Patent Number: 5,828,680
[45] Date of Patent: Oct. 27, 1998

[54] HYBRID TYPE PASSIVELY AND ACTIVELY MODE-LOCKED LASER SCHEME

[75] Inventors: Kyong-Hon Kim; Seo-Yeon Park; Hak-Kyu Lee; Min-Yong Jeon, all of Daejeon, Rep. of Korea

[73] Assignee: Electronics and Telecommuications Research Institute, Daejeon, Rep. of Korea

[21] Appl. No.: 712,597

[22] Filed: Sep. 13, 1996

[30] Foreign Application Priority Data

Oct. 31, 1995 [KR] Rep. of Korea .................... 95-38769

[51] Int. Cl.⁶ .............. H01S 3/098; H01S 3/10; H01S 3/30; H01S 3/083
[52] U.S. Cl. .................. 372/18; 372/25; 372/6; 372/22; 372/94; 372/700
[58] Field of Search .................. 372/18, 6, 22, 372/94, 700, 25

[56] References Cited

U.S. PATENT DOCUMENTS 5,212,711 5/1993 Harvey et al. ............... 372/94

OTHER PUBLICATIONS

Nakazawa et al, "Generation of 98fs Optical Pulses Directly from an Erbium–doped Fibre Ring Laser at 1.57 um", Electronic Letters, vol. 29, No. 1, pp. 63–65, Jan. 1993.

*Primary Examiner*—Rodney B. Bovernick
*Assistant Examiner*—Luong-Quyen T. Phan
*Attorney, Agent, or Firm*—Antonelli, Terry, Stout, & Kraus, LLP

[57] ABSTRACT

A hybrid type passively and actively mode-locked laser scheme is disclosed, in which not only the capability of producing ultra-short optical pulses by the conventional passively mode-locked optical fiber laser scheme is utilized, but also the repetition rate variation capability and the optical pulse synchronization capability of the conventional actively mode-locked laser scheme are utilized. Consequently, all the advantages of the two conventional laser schemes are obtained in the present invention. Specifically, two loops are coupled together, and one of the two loops consists of a non-linear amplifying loop of the existing passively mode-locked scheme, while the other loop includes an optical modulator and an optical gain medium for the loop to perform the function of an actively mode-locked scheme. Further the other loop includes a time delay line so as to adjust the laser oscillation repetition rate. The ultra-short optical pulses of the present invention will be applied to high speed time division multiplexed optical communication system, high speed optical signal processors, and ultrafast optical phenomenon studies.

7 Claims, 5 Drawing Sheets

HYBRID TYPE PASSIVELY AND ACTIVELY MODE-LOCKED LASER SCHEME

BACKGROUND OF THE INVENTION

1. Field of the Invention

The present invention is related to a hybrid type passively and actively mode-locked laser scheme, which provides easy electrical control, short laser pulse generation at a high repetition rate, and is applicable to high-speed optical time-division-multipexed communication systems, optical signal processors and ultrafast optical phenomenon studies.

2. Description of the Prior Art

Generally, ultrashort pulse generation of a high and easily controllable repetition rate is required for application to high-speed optical time-division-multipexed communication systems, optical signal processors and ultrafast optical phenomenon studies.

Semiconductor lasers and fiber lasers have been significantly studied for such applications. Fiber lasers have advantages over the relatively better optical coupling to the existing optical transmission lines than the semiconductor lasers. Ultrashort laser pulses of the order of pico seconds ($10^{-12}$ seconds) or below have been obtained mostly based on passively mode-locked laser schemes.

In the passively mode-locked laser scheme the laser pulses are self-initiated, and their repetition rate is limited to the fundamental or a harmonic frequency of the cavity resonance. Therefore, as long as no externally driven reproduction of the pulse synchronizing signals is made, the electrical control of the synchronizing laser pulse signals is not easy.

On the other hand, in the actively mode-locked laser schemes, the synchronization of the laser pulse signals is relatively easier than that in the passively mode-locked schemes because the electrical signals driving the actively mode locker can be used for electrical control. One disadvantage of the actively mode-locked laser schemes is that the laser pulses thus obtained have a longer temporal pulse length compared to those obtained with the passively mode-locked laser schemes.

The conventional fiber optics laser schemes in the passively or actively mode-locked geometries for obtaining ultra-short optical pulses will be described referring to FIGS. 1, 2 and 3.

FIGS. 1 to 3 illustrate the laser schemes either passively or actively mode-locked.

FIG. 1 illustrates passively mode-locked fiber optics laser scheme. A nonlinear amplified loop mirror NALM and a linear loop LL are connected together by means of optical (or optical fiber) coupler (50/50 FC) so as to form a circulating optical path. In the nonlinear amplified loop mirror NALM, a wavelength-division multiplexing optical (or optical fiber) coupler WDM FC is used to couple a pump laser beam, which excites the erbium ions in the erbium-doped fiber EDF. One end of the wavelength-division multiplexing optical (or optical fiber) coupler WDM FC is connected to a dispersion-shifted fiber DSF and then to one arm of the optical coupler FC. The other end of the wavelength-division multiplexing optical (or optical fiber) coupler WDM FC is connected to the erbium-doped fiber EDF and then to a polarization controller PC. The other end of the polarization controller PC is then connected to another end of the optical coupler FC on the same side as the DSF connected arm. Meanwhile, in the linear loop LL, an optical isolator is connected to one output arm of the optical coupler FC (which is connected to the nonlinear amplified loop mirror NALM), and another polarization controller PC is connected to the other output arm of the optical coupler FC. Between these optical isolator and polarization controller PC an optical coupler FC is inserted to take the mode-locked laser output through one of its output arms.

The conventional passively mode-locked fiber laser scheme shown in FIG. 1 in which two loops are connected to the optical coupler, can deliver ultra-short optical pulses, but the laser oscillation repetition rate is limited to the cavity's fundamental resonance frequency.

FIGS. 2A and 2B illustrate two conventional ring-type passively mode-locked laser schemes. Referring to FIG. 2A, a polarizer, an optical isolator, two polarization controllers PCs, an erbium-doped fiber EDF, a wavelength-division multiplexing optical fiber coupler WDM FC, and an optical coupler FC are connected together to form a loop. The pump laser beam which excites the erbium ions in the erbium-doped fiber EDF is coupled through the wavelength-division multiplexing optical (or optical fiber) coupler WDM FC, and the mode-locked laser output is taken through the one free end of the optical coupler FC.

Referring to FIG. 2B, laser geometry is similar to that of FIG. 2A except using a low-bipolarization maintaining fiber instead of the polarizer used in FIG. 2A.

In these two schemes as shown in FIGS. 2A and 2B the mode-locked laser oscillation is self-initiated through an external influence, and laser pulses are generated only at the cavity's fundamental resonance frequency. Thus, it is difficult to synchronize the optical pulses with external electrical signals and to change the pulse repetition rate.

FIG. 3 illustrates a conventional type of actively mode-locked fiber laser in a ring configuration. An optical modulator, an optical isolator, two polarization controllers PCs, an erbium-doped fiber EDF, a wavelength-division multiplexing optical fiber coupler WDM FC, and an optical coupler FC are connected together to form a loop. The pump laser beam which excites the erbium ions in the erbium-doped fiber EDF is coupled through the wavelength-division multiplexing optical (or optical fiber) coupler WDM FC, and the mode-locked laser output is taken through the one free end of the optical coupler FC. In this laser scheme the mode-locked laser pulses can be generated at a repetition rate corresponding the harmonic frequency of the laser cavity resonance, but the pulses' temporal length is usually longer than that obtained with the passively mode-locked laser schemes of FIGS. 1 and 2 unless an external pulse compression function is provided.

By adding a wavelength tunable filter to the laser scheme shown in FIG. 3 a wavelength tunable actively mode-locked laser operation can also be obtained. However, this laser output pulse length is also usually longer than that obtained with the passively mode-locked laser schemes unless an external pulse compression function is provided.

As described above, the schemes of FIGS. 1, 2A and 2B are good in generating ultra-short optical pulses, but variation of the pulse repetition rate and electrical signal control is not easy. In the actively mode-locked laser scheme of FIG. 3, the advantages are such that varying the pulse generating rate at a ratio of an integer multiple of the resonance frequency is relatively easy, and further that the pulse synchronizing signals can be easily electrically utilized. However, the disadvantage is that optical pulses of a longer temporal width are generated compared to those in the passively mode-locked schemes.

In an attempt to overcome the above described disadvantages, a scheme as illustrated in FIG. 4 has been demonstrated. In this scheme of a ring type laser, an optical phase modulator and a polarization controller PC are additionally provided on the optical path, so that actively and passively mode-locked fiber laser would be realized.

However, this scheme showed a phenomenon that a plurality of cleaved passively mode-locked optical pulses exist within each of the actively mode-locked laser pulse envelopes. Therefore, its practicality is insufficient.

FIG. 5 illustrates a scheme which is aimed at overcoming the above disadvantages. In this scheme, an optical fiber amplification gain section and a positive GVD fiber are added to the linear loop LL. Thus, the passively mode-locked laser pulses are compressed to obtain optical pulses of shorter time width.

In this scheme, however, except for the time width of the pulses being shortened, the other disadvantages of the scheme of FIG. 1 have not been overcome.

Meanwhile, passively or actively mode-locked lasers are disclosed in European Patent EP-0599453, U.S. Pat. No. 5,212,711, U.S. Pat. No. 5,046,184, and other patents and treatises.

According to European Patent EP-0599453, in a scheme in which optical paths of two loops are connected by means of an optical coupler and controllable optical phase shifter is added to the loop corresponding to an nonlinear amplified loop, an easy initiating method of the passively mode-locked laser pulse generation is proposed.

Meanwhile U.S. Pat. No. 5,046,184 includes a main resonator having a laser gain medium and an external resonator having a non-linear device to cause a non-linear optical phase shift. Phase-shifted optical signals are made to be feedback to the main resonator, by an external resonator so that a passive mode-locking would occur.

These are passively mode-locked types, and therefore, ultra-short optical pulses can be generated. However, it is difficult to synchronize the optical pulses with external electrical signals.

U.S. Pat. No. 5,212,711 proposes a ring type actively mode-locked optical fiber laser scheme with an added Febry-Perot optical resonator having a free spectral range which is almost equivalent to an integer multiple of the basic resonance frequency of the laser. Thus, the energy, the pulse shape and the pulse width of the individual pulses are made uniform.

This scheme has advantages such that the variation of the pulse generating rate to a repetition ratio of an integer multiple of the resonance frequency is relatively easy, and that the pulse synchronizing signals can be easily utilized electrically. However, the temporal width of the generated optical pulses is relatively wide compared to that of the passively mode-locked laser pulses.

In all of the above described prior art, only one the passively mode-locked or actively mode-locked mechanisms has been adopted, but not both simultaneously. Therefore, the disadvantages of the passively mode-locked type and the disadvantages of the actively mode-locked type remain all the same.

SUMMARY OF THE INVENTION

The present invention is intended to overcome the above described disadvantages of the conventional techniques.

Therefore it is an object of the present invention to provide a hybrid type passively and actively mode-locked laser scheme, with which an optical source generating ultra-short optical pulses at a high repetition rate can be realized and can be used in applications to the study of optical non-linear effects and of time-division and wavelength division optical communication technologies. The present scheme simultaneously utilizes the ultra-short optical pulse generation mechanism of the conventional passively mode-locked scheme and the simplicity of the pulse synchronization and the variability of the repetition rate of the conventional actively mode-locked scheme, so that easier electrical control is possible and ultra-short optical pulses can be obtained.

In achieving the above object, the hybrid type passively and actively mode-locked laser scheme according to the present invention is characterized in that, in a laser consisting of two loops connected by means of an optical coupler, a non-linear amplifying loop mirror is used as a saturable absorber, and an electro-optical modulator is used as an active mode locker, thereby providing a hybrid type passively and actively mode-locked laser mechanism.

The present invention is further characterized in that an electro-optical modulator, used as an active mode locker, is placed in the linear loop of the laser scheme, that an optical gain medium is added so as to obtain stably mode-locked optical pulses, and that an optical delay line is inserted for varying the laser oscillation frequency.

BRIEF DESCRIPTION OF THE DRAWINGS

The above object and other advantages of the present invention will become more apparent by describing in detail the preferred embodiment of the present invention with reference to the attached drawings in which.

DETAILED DESCRIPTION OF THE PREFERRED EMBODIMENT

Figure 1:
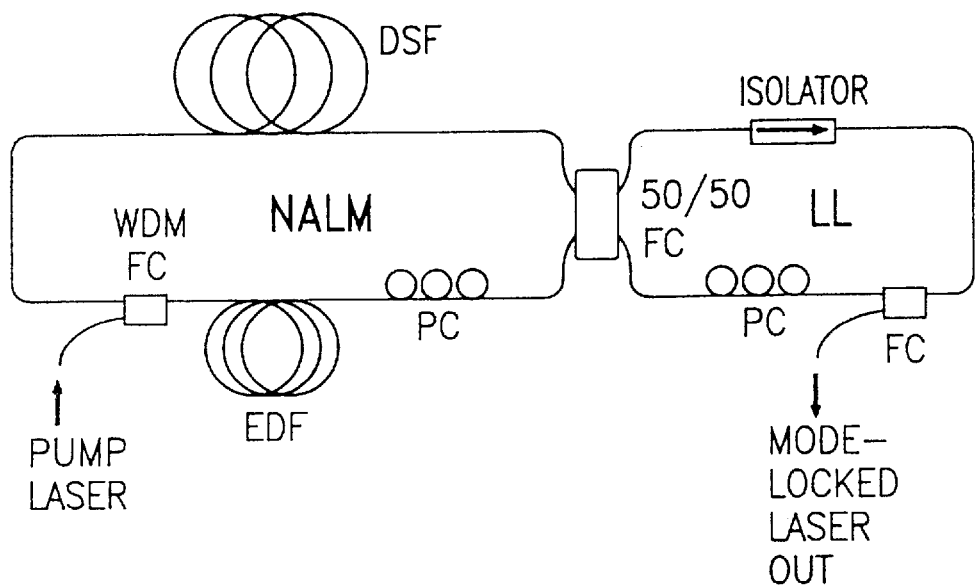
FIG. 1 illustrates a conventional passively mode-locked optical fiber laser scheme using an "8" shaped resonator.
Figure 2A:
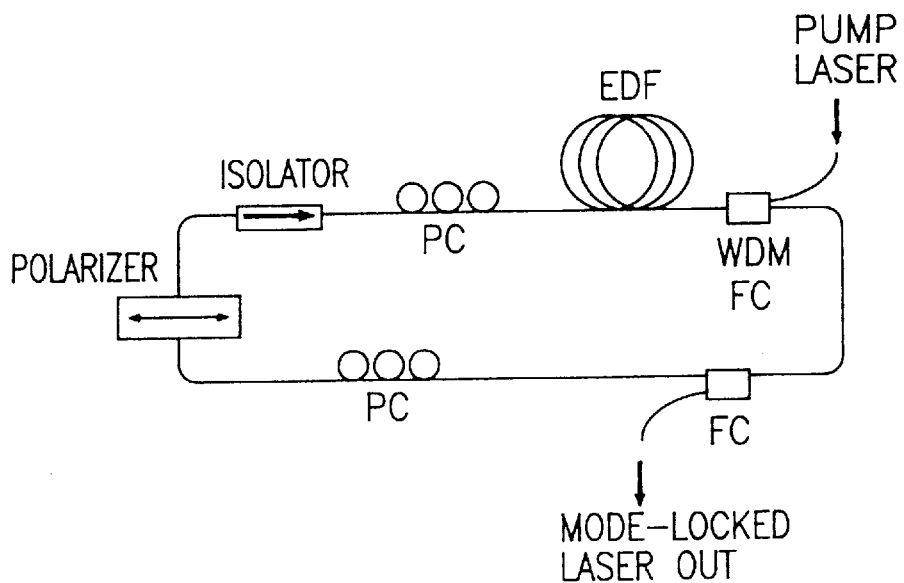
FIGS. 2A and 2B illustrate other conventional passively mode-locked optical fiber laser schemes using a ring type resonator.
Figure 2B:
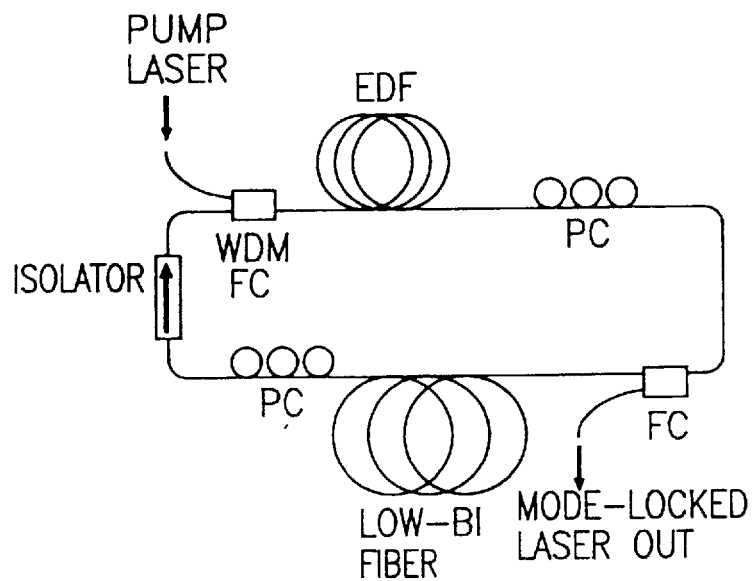
Figure 3:
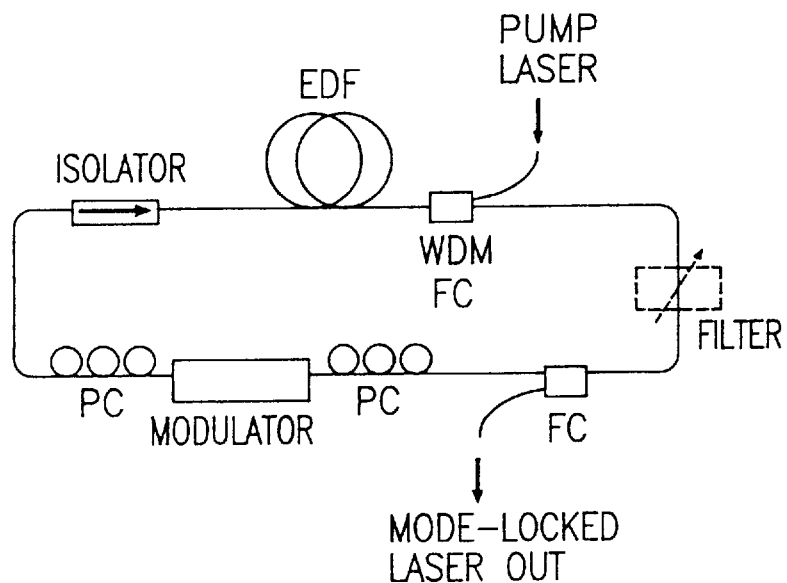
FIG. 3 illustrates a conventional actively mode-locked optical fiber laser scheme using a ring type resonator.
Figure 4:
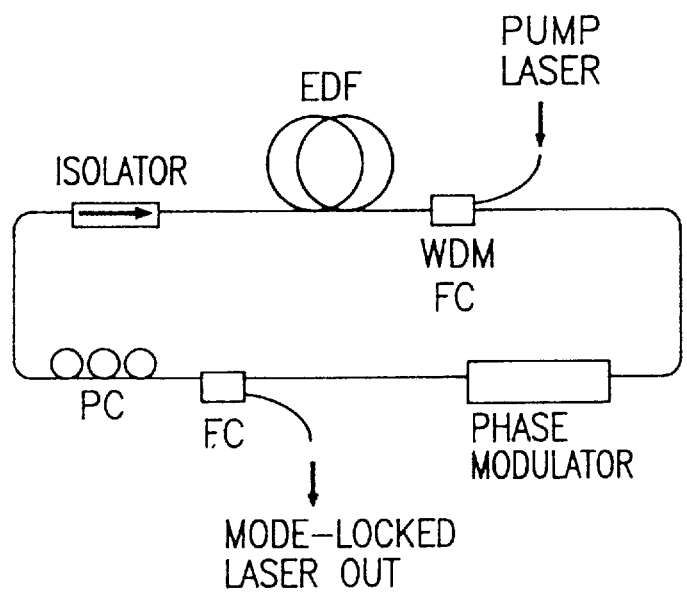
FIG. 4 illustrates a conventional actively and passively mode-locked hybrid type optical fiber laser scheme using a ring type resonator.
Figure 5:
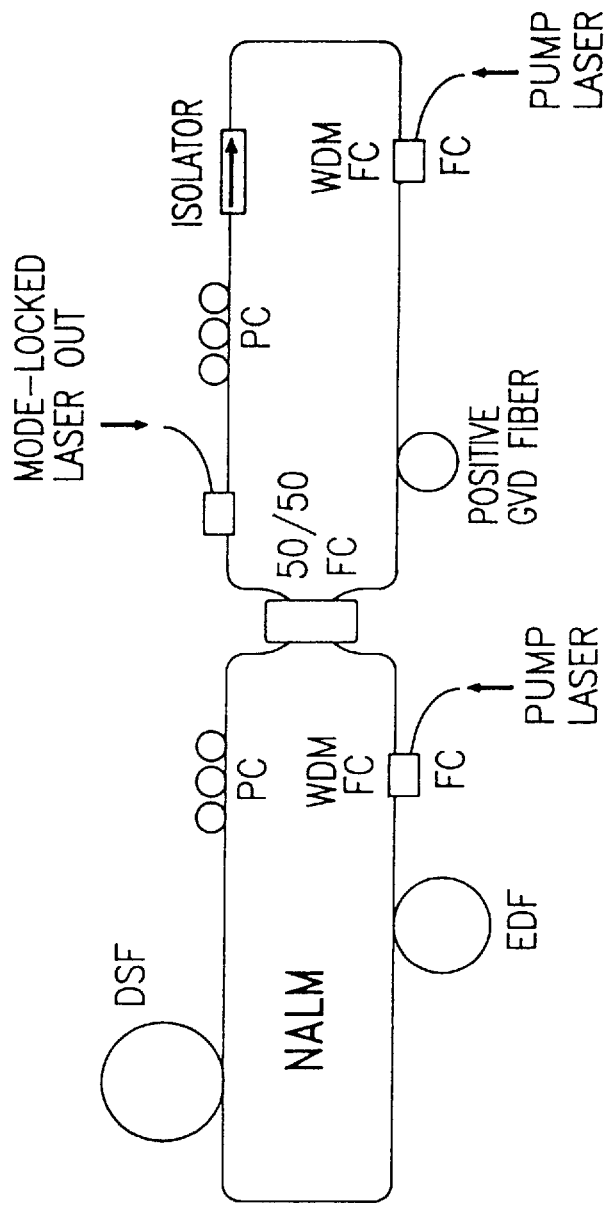
FIG. 5 illustrates the laser scheme of FIG. 1 in which a pulse contraction scheme is additionally provided.
Figure 6:
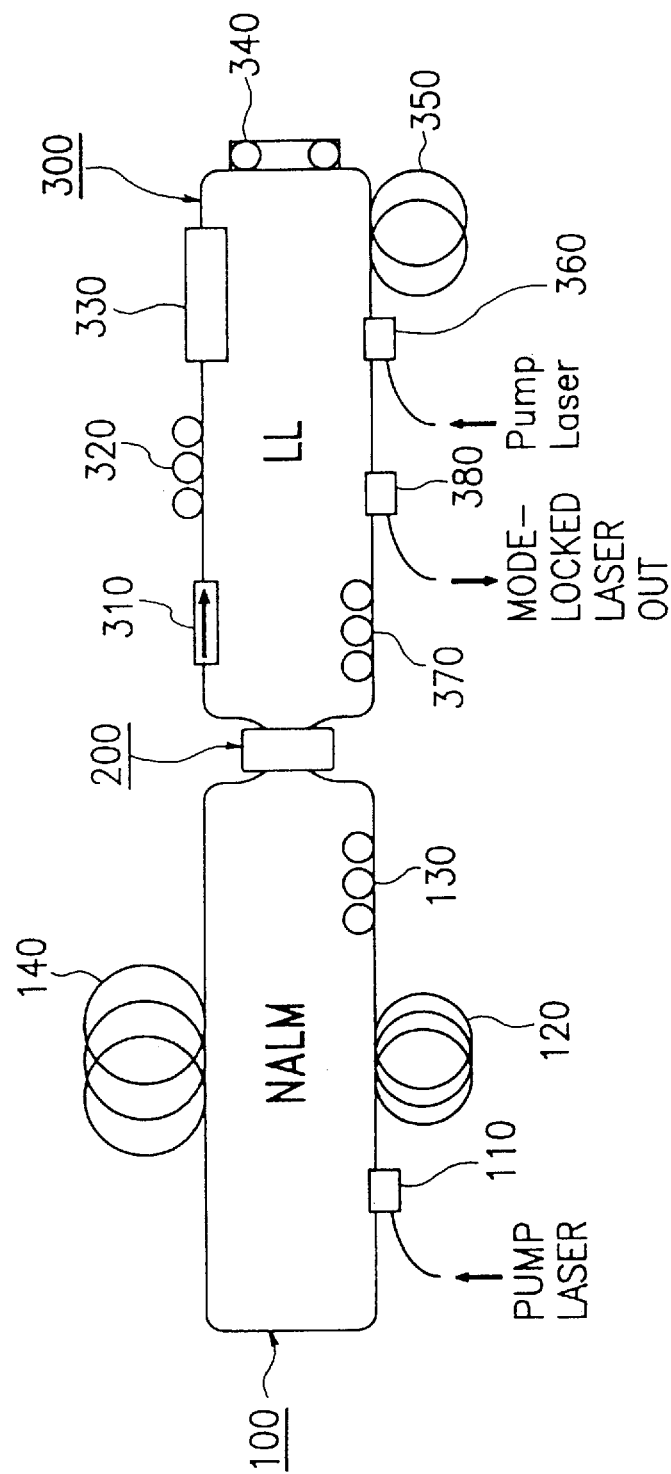
FIG. 6 illustrates the hybrid type passively and actively mode-locked laser scheme according to the present invention.

The present invention will be described in detail referring to FIG. 6. FIG. 6 illustrates the hybrid type passively and actively mode-locked laser scheme according to the present invention, in which two loops are connected together by an optical coupler.

That is, a non-linear amplifying loop mirror (NALM) 100 and a linear loop (LL) 300 are connected together by an optical (or optical fiber) coupler (50/50 FC) 200, so that optical paths would be formed.

In the non-linear amplifying loop mirror (NALM) 100, a wavelength dividing optical (or optical fiber) coupler (WDM FC) 110 which receives laser pulses from a laser pump is connected through a dispersion-shifted optical fiber (DSF) 140 to the optical coupler (FC) 200. Further, connections are made from the wavelength division multiplexing optical (or optical fiber) coupler (WDM FC) 110 through an erbium doped optical fiber (EDF) 120 and a polarization controller (PC) 130 to the optical coupler (FC) 200.

Meanwhile, in the linear loop (LL) 300, the optical coupler (FC) 200, which is connected to the non-linear amplifying loop mirror (NALM) 100, is connected through a polarization controller (PC) 370 to an input side optical coupler (FC) 380. Further, connections are made from the optical coupler (FC) 200 through an optical isolator 310, a second polarization coordinator 320, an optical modulator 330, an optical delay line 340, an optical gain medium 350, and a wavelength division multiplexing optical coupler 360 (which receives laser pulses from a pump laser) to an input side optical coupler (FC) 380. Through the output side optical coupler (FC), a laser output is taken.

The principal features of the present invention are as follows. In a passively mode-locked optical fiber laser scheme which consists of two loops connected together by means of an optical coupler, there are added in the linear loop 300 the polarization controller 320, the optical modulator 330, the optical delay line 340, the optical gain medium 350, and the optical coupler 360 (which receives a pump laser beam), whereby a passive mode locking mechanism and an active mode locking mechanism are simultaneously carried out.

In the present invention, the passive mode locking characteristics occur in the non-linear amplifying loop mirror 100. Then the optical polarization is controlled by the polarization controller 320 of the linear loop 300. Then the electrically modulating frequency which is supplied to the optical modulator 330 is adjusted to an integer multiple of the basic resonator frequency. The timing and gain are adjusted by the optical delay line 340 and the optical gain medium 350. Then the pumping power of the pump laser which is supplied to the wavelength division multiplexing optical coupler 360 is properly stepped up, resulting in an active mode locking mechanism being activated.

That is, in the laser scheme of the present invention, a passive mode locking operation is realized by using the non-linear amplifying loop mirror 100, while an active mode locking operation is realized by properly utilizing the. optical gain delay line 340, the optical gain medium 350, the optical modulator 330, and the polarization controller 320 of the linear loop 300.

The laser pulses which are produced by the hybrid type mode-locked laser scheme have a shorter temporal width than those of the solely actively mode-locked case. Further, the variation of the laser oscillation frequency and the electrical signal synchronization to the mode-locked laser pulses are easier than those of the solely passively mode-locked case.

Further, since the optical delay line 340 is added into the linear loop 300, not only can the modulating frequency of the optical modulator 330 be adjusted in accordance with the variation of the length of the optical delay line 340, but also the hybrid type mode-locked laser can be oscillated at the desired laser oscillation frequency by adjusting the length of the optical delay line 340 and the modulating frequency of the optical modulator 330.

Further, the optical fiber laser scheme is realized by using erbium doped fibers EDFs as the optical gain media 350 and 120 by using laser diodes as the pumping optical sources, and by using all components connected to optical fibers. Consequently, a relatively compact optical fiber laser can be obtained.

According to the present invention as described above, the synchronization between the oscillating frequency and the oscillated laser pulses is easily achieved, and ultra-short optical pulses can be obtained. Therefore, the application of the present invention as an optical source will be extended to the high speed time-division multiplexed optical communication system, to the high speed optical signal processors, and to the analysis of the optical characteristics. Its contribution to the mentioned fields will be significant.

Further, since the electrically synchronizing signals can be easily controlled, and relatively short optical pulses can be produced, the present invention can be suitably utilized for the above mentioned application fields using the high speed ultra-short optical pulses.

Many different embodiments of the present invention may be constructed without departing from the spirit and scope of the invention. It should be understood that the present invention is not limited to the specific embodiments described in this specification. To the contrary, the present invention is intended to cover various modifications and equivalent arrangements included within the spirit and scope of the claims.

What is claimed is:

1. A hybrid type passively and actively mode-locked laser scheme comprising:

a non-linear amplifying loop mirror;

a linear loop;

optical coupling means for connecting said non-linear amplifying loop mirror and said linear loop to form optical paths;

a polarization controller to coordinate a polarization state of optical signals on one of said optical paths within said linear loop;

an optical modulator to adjust an electrical modulating frequency to a level of an integer multiple of a basic resonator frequency;

an optical gain medium added in the linear loop to adjust a gain of optical signals; and a wavelength dividing optical coupler to couple a laser beam from a pump laser;

wherein a hybrid type passively and actively mode-locked laser pulse output is achieved.

2. The hybrid type passively and actively mode-locked laser scheme as claimed in claim 1, wherein the said linear loop comprises an optical delay line for adjusting the modulating frequency of the said optical modulator and for adjusting a laser oscillation frequency.

3. The hybrid type passively and actively mode-locked laser scheme as claimed in claim 1, wherein the said optical gain media are erbium doped silica optical fibers.

4. The hybrid type passively and actively mode-locked laser scheme as claimed in claim 1, wherein the optical sources of the said laser pump are laser diodes.

5. A mode-locked laser scheme utilizing a figure-eight passive mode-locking fiber laser and a ring-type active and harmonically mode-locking laser together simultaneously to achieve passive and active mode-locking laser pulse output, comprising:

a non-linear amplifying loop mirror (NALM);

a linear loop; and a 2×2 optical waveguide coupler connecting the NALM and the linear loop with two arms of said coupler being placed on each side, respectively, forming the figure-eight configuration, said linear loop includes:
an optical isolator connected directly to said 2×2 optical waveguide coupler at one arm thereof on an opposite side of said NALM to circulate an optical signal in only one direction;
a first polarization controller located next to said optical isolator to set the polarization state of the optical signal at an optical path point coincident to polarization characteristics of an optical modulator,
said optical modulator being disposed next to said first polarization controller to adjust an electrical modulating frequency to a harmonic frequency defined by a laser resonator's round-trip time, to deliver mode-locked laser pulses at the modulating frequency, and to be placed in the linear loop in order that said NALM performs the passive type mode-locking and pulse compression mechanism as a whole;
an optical gain medium connected to the optical modulator to amplify the optical signal in the loop;
a wavelength-division-multiplexing coupler connected to the optical gain medium to couple a laser beam from a pump laser into the loop;
an optical coupler to extract the laser output from the circulating optical loop; and
a second polarization controller located next to said 2×2 coupler on another arm of the 2×2 coupler on a same side with respect to the optical isolator, to set a polarization state of optical signal entering said NALM through said 2×2 coupler into a desired polarization state.

6. A mode-locked laser as claimed in claim 5, wherein said optical gain medium is an erbium-doped silica fiber for generating a laser beam at 1.5 µm wavelength region.

7. A mode-locked laser as claimed in claim 5, wherein said pump laser is a laser diode.

* * * * *